Patented June 24, 1930

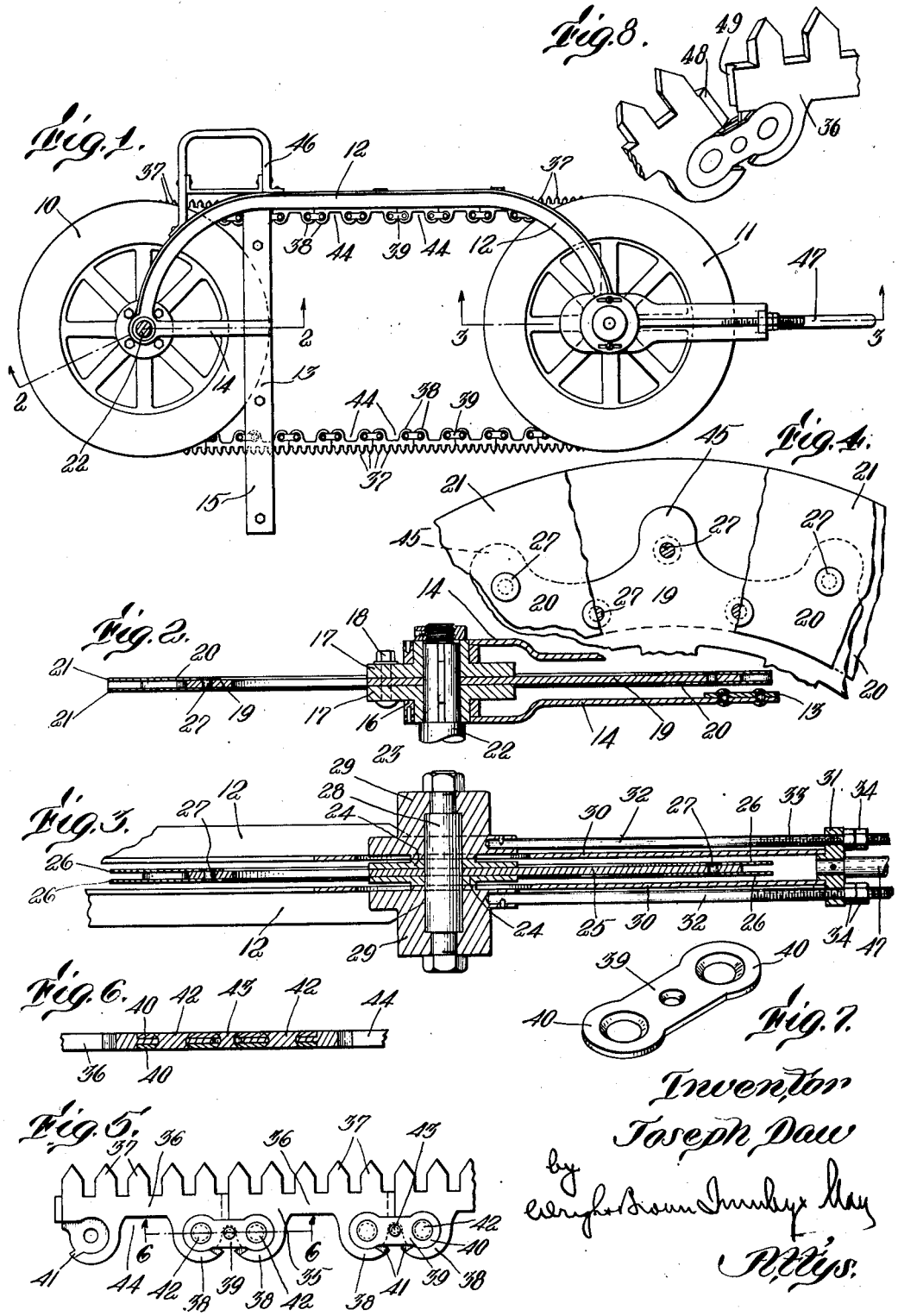

1,766,013

UNITED STATES PATENT OFFICE

JOSEPH DAW, OF QUEBEC, QUEBEC, CANADA, ASSIGNOR TO BROWN COMPANY OF BERLIN, NEW HAMPSHIRE, A CORPORATION OF MAINE

PORTABLE CHAIN SAW

Application filed December 28, 1926. Serial No. 157,468.

This invention relates to an improved portable power saw and is an improvement on a saw designed for similar purposes and disclosed in my Patent No. 1,598,853 issued September 7, 1926. Saws which are power operated save considerable time and labor where it is possible to use them. By my invention, I provide a power-operated saw which is of sufficiently strong construction to be used for felling trees and for cutting up felled trees into lengths and which can be carried around and operated by one man without difficulty. Among the various uses to which a saw of this type is particularly adapted is that of sawing up logs as they lie in a pile. Heretofore it has been the practice in the wood pulp industry to drag the logs from the pile one at a time and present them to a stationary power driven buzz saw or to cut them by hand. This involves unnecessary handling with consequent waste of time and labor, all of which add to the expense of procuring the pulp wood. My invention is adapted to be used on log piles, its ready portability enabling an operator to saw up the logs in the pile rapidly by simply blocking them up one at a time to clear the rest of the logs on the pile during the sawing operation. Various other uses and advantages of my saw will suggest themselves to one skilled in the art from the disclosure thereof contained in the following description and on the drawing, of which,—

Figure 1 is a side elevation of the device.

Figure 2 is a section on the line 2—2 of Figure 1.

Figure 3 is a section on the line 3—3 of Figure 1.

Figure 4 is a fragmentary detail on a larger scale of a portion of one of the sprocket wheels.

Figure 5 is an elevation of a portion of my improved saw chain.

Figure 6 is a section taken on the line 6—6 of Figure 5.

Figure 7 shows in perspective one of the links for holding the saw elements in the chain together.

Figure 8 is a fragmentary perspective of a pair of links showing the alining structure on the ends of the shanks.

Referring to the drawing in detail, the saw comprises a chain composed of a number of links, each of which are provided with saw teeth, these links being held together by pairs of connecting links. The chain as a whole is passed edgewise over the periphery of two sprocket wheels which are attached securely to a frame and forms two parallel stretches between the wheels. One of these wheels is power driven by any suitable means, the other wheel being an idler. In Figure 1 the power driven wheel is shown at 10, the idler being designated as 11. A doubled, arched frame 12 straddles both these wheels and supports them in a common plane. From each of the arched frame members 12 a reaction member or bar 13 extends downwardly, this bar being connected as by a horizontal strut 14 with one end of the arched frame member 12 at the hub of wheel 10. The bar 13 is extended as at 15 below the saw chain and thus provides a support to rest against a log and take the reactive pressure therefrom caused by the resistance to the cutting action of the saw. A suitable bearing for the wheel 10 is provided for at the junction of the strut 14 and the frame member 12, this bearing being of any desired construction. As shown in Figure 2, it may comprise a pair of rings 16 formed on or attached to the frame. Within these bearing rings is mounted the hub of the wheel 10 which may comprise a pair of complementary collars 17 secured together by suitable bolts 18 and adapted to clamp between them the web of the wheel. In order to provide a wheel which is both light, strong, and easily constructed, this web may comprise a plate 19 of suitable shape on either side of which is secured by riveting, spot welding, or otherwise, a thin plate 20, this pair of thin plates forming flanges 21 on the periphery of the wheel between which the chain is adapted to be received. The flanges are preferably extended radially outward beyond the ends of the teeth in the chain so as to serve with a portion of the frame 12 as a guard to protect an operator from the portion of the chain which is not actually in cutting position. The wheel 10 may be mounted on a power shaft 22, being keyed thereto if desired by a key 23 which is fitted into complementary grooves in the shaft and in the hub member 17. The shaft 22 may be turned by any suitable prime mover (not shown), the motor being preferably as powerful as consistent with sufficient lightness of weight. For this purpose, an electric or fluid motor may be found desirable.

The wheel 11 is preferably constructed similar to the wheel 10. As shown in Figure 3, it may comprise a hub member consisting of a pair of collars 24 between which may be bolted, riveted, or otherwise secured, a plate 25 to the peripheral portion of which a pair of flanges 26 are secured as by suitable rivets 27 or any equivalent means. The flanges 26 extend radially outward beyond the ends of the saw teeth and thus serve as a guard in the same way as do the flanges 21 of the wheel 10. The wheel 11 is loosely mounted on a fixed shaft 28 to each end of which is secured a block 29. The frame members 12 which straddle the wheel 11 extend downwardly between the hub member 24 of the wheel 11 and the blocks 29. These members 12 are also provided with extensions 30 which project radially outward beyond the periphery of the wheel 11 and are joined at their outer ends by a suitable block 31 through which pass a pair of rods 32, each of these rods 32 being secured to one of the blocks 29. The outer ends of the rods 32 are preferably threaded as at 33 and are provided with nuts 34 which engage the outer face of the block 31 and may be adjusted to move the wheel 11 bodily away from the wheel 10 and thus to put tension on the saw chain, the junction of the frame end with the extensions 30 having horizontal slots to permit adjusting movement of the blocks 29.

The construction of the chain itself is indicated in Figure 5. As shown therein, the chain comprises series of links 35, each of which comprises a central shank 36 on one side of which a number of saw teeth 37 project, on the other side of which a pair of lugs 38 project. To these lugs are pivotally attached connecting links 39 which are preferably supplied in pairs between successive links 35. Each projection 38 on a link 35 has cut into each face thereof a recess of sufficient depth to receive an end of a link 39 so as to permit the outer faces thereof to lie flush with its own faces. As the end portions of the links 39 are of circular contour as at 40, the recesses in the projections 38 which receive the ends 40 are also circular in shape, one side being cut away as at 41 to receive the shanks of the links 39, the cut-away portion also being flared to permit the link 39 to turn on the rivet 42 which pivotally connects it with the link 35. Figure 6 shows in section the relative arrangement of a pair of connecting links 39 and a pair of successive links 35 to which they are connected. Each pair of links 39 is preferably strengthened by a small rivet 43 which connects their mid points and stiffens them mutually. As shown in Figure 5, the flared cut-away portions in the projections 38, which permit limited pivotal movement of the links 39, do not extend to the full diameter of the circular recesses which receive the ends 40 of the links 39. As a result, the pulling stresses on the links 39 are borne by the ends 40 and not by the rivets 42 which hold the links in place. This results in a stronger construction of the chain. The ends of the shank portions 36 of the links 35 are preferably formed with a double bevel edge 48 at one end and a recess 49 at the other to receive the end edge of the next adjoining link 35. This arrangement of interfitting of edges and recesses results in keeping the successive teeth properly aligned when the links are straightened into line after passing around a wheel. Between successive projections 38 on each link 35 is a hollow 44 and the peripheries of the wheels 10 and 11 are formed with suitable sprockets 45 to fit into the hollows 44 between the projections 38. This results in a positive drive of the chain.

On the bridge members 12 over a portion of the wheel 10, a suitable handle 46 may be mounted to enable the operator to steady the apparatus while it is operated and to carry the apparatus about. If desired, an additional handle 47 may be secured to the block 31 in case a second operator assists in the operation or transportation of the saw.

Having thus described an embodiment of my invention, it should be evident to those skilled in the art that various changes and modifications may be made therein without departing from its spirit or scope as defined by the appended claim.

I claim:—

A chain saw comprising a plurality of saw-toothed links and a pair of connecting links between each two successive toothed links, said toothed links each having at each end a pair of circular shallow recesses in the side faces thereof opening out toward its end and a perforation concentric with each pair of recesses, said connecting links having circular end portions with central countersunk perforations registering with the perforations in the toothed links, each said circular end portion having an arcuate edge engaging the edge of the corresponding recess over an arc of more than 180°, and fastening elements extending through and filling said countersunk perforations so as to retain the end portions of said connecting links in corresponding recesses in the toothed links, the outer faces of said connecting links and the end faces of said fastening elements being flush with the side faces of said toothed links.

In testimony whereof I have affixed my signature.

JOSEPH DAW.